United States Patent [19]

Giuliano

[11] Patent Number: 5,792,488
[45] Date of Patent: Aug. 11, 1998

[54] DEMOLDING APPARATUS FOR REMOVING CHOCOLATES FROM MOLDS

[75] Inventor: Agostino Giuliano, Rozzano, Italy

[73] Assignee: Carle & Montanari S.p.A., Milan, Italy

[21] Appl. No.: 852,192

[22] Filed: May 6, 1997

[30] Foreign Application Priority Data

May 9, 1996 [IT] Italy .................. MI96A0932

[51] Int. Cl.[6] .................................. B29C 39/36
[52] U.S. Cl. ............ 425/439; 425/436 R; 425/436 RM; 425/453; 426/512
[58] Field of Search ................. 425/439, 453, 425/436 R, 436 RM, 454, DIG. 200, DIG. 201; 426/512, 515

[56] References Cited

U.S. PATENT DOCUMENTS

| | | | |
|---|---|---|---|
| 1,781,345 | 11/1930 | Savy et al. | 425/439 |
| 2,859,713 | 11/1958 | Noel | 425/453 |
| 4,106,400 | 8/1978 | Noel | 425/453 |
| 4,936,764 | 6/1990 | Lyons et al. | 425/439 |
| 4,954,069 | 9/1990 | Friedwald | 425/453 |
| 5,591,464 | 1/1997 | Renzo | 425/453 |

FOREIGN PATENT DOCUMENTS 3224211  2/1983  Germany .................. 425/439

*Primary Examiner*—Khanh P. Nguyen
*Attorney, Agent, or Firm*—Kirschstein et al.

[57] ABSTRACT

A demolding apparatus removes chocolates from molds. The apparatus includes upper and lower conveyor systems and an inverting unit. Full molds filled with chocolate are carried by the lower conveyor to the inverting unit which inverts the full molds and transfers the inverted full molds to the upper conveyor. The chocolates are emptied from the inverted full molds and conveyed away from the apparatus. The empty molds are carried by the upper conveyor to the inverting unit which inverts and transfers the empty molds to the lower conveyor.

6 Claims, 1 Drawing Sheet

5,792,488

DEMOLDING APPARATUS FOR REMOVING CHOCOLATES FROM MOLDS

BACKGROUND OF THE INVENTION

The present invention relates to a demolding unit for a plant for molding chocolate or similar products, the plant being of intermittent operation and fitted with free molds, that is to say molds that can be detached from the parallel conveyor chains.

It is known to those skilled in the art that plants for molding chocolate, or similar products, are made up of a number of sections, each of which is designed to execute one well-defined operation.

Thus, one section of the molding plant is for preparing the empty molds, another unit is designed to deposit the product in the mold wells, after this will come an apparatus for tapping and flattening the pasty product in the molds, then a chilling unit for solidifying the deposited product, and next an apparatus for removing the solidified products from the molds, an operation also generally known as demolding.

The stage of removing (demolding) the solid product from the molds is, as is well known, carried out by a process of inverting the mold, for which purpose mold rotating devices are used.

With other known means the bottom of the mold is tapped by special tapping or vibrating devices, causing the solidified products to drop onto a belt which then carries the demolded product away to a packaging station.

After the solidified products have fallen out, the empty mold must be inverted again, in order that the openings of the wells are uppermost, and the mold must then be reintroduced into the circuit consisting of two parallel chains, in order to return after various treatments to the start of the molding plant.

In known molding plants with intermittent movement, the mold is generally taken, for mechanical reasons, after the product has been demolded, by a conveyor laid out at right angles to the direction of advance of the mold, and the empty mold is then transferred on a parallel line consisting of parallel conveyor chains running in the reverse direction.

Another approach involves taking the mold from a conveyor and reintroducing this mold into a return circuit situated at a higher level than the plane containing the molds arriving from the molding plant.

In all known plants of this kind there is the drawback that a great deal of space is needed, the molding plant being laid out in two parallel lines connected together by crosswise conveying elements, all laid out over a rectangular area that does not give access to the interior.

In another case it is necessary for the height of the installation to be greater than the maximum dimensions actually available in manufacturing environments.

SUMMARY OF THE INVENTION

It is an object of the present invention to overcome the drawbacks of the prior art, and to devise a demolding unit for molds moved intermittently and containing articles of chocolate or the like, the unit being extremely compact and able to accommodate the entire demolding unit in a closed and encapsulated module.

According to the present invention, this object is achieved in that on the inside of a chamber of the demolding unit is a deflection wheel that takes a chain used for supplying, by means of the upper portion of chain, molds filled with chocolate, while the lower portion of the chain carries empty molds away, in that above the portion of chain used for supplying full molds is a closed loop of chain that takes, along the lower portion of the looped chain, molds filled with chocolate, while along the upper portion of chain it takes empty molds, and in that between the lower supply chain and the loop of chain situated above the latter is a device for receiving chocolate-filled molds and empty molds, and in that this mold receiving device can execute a 180° rotation in response to a command.

BRIEF DESCRIPTION OF THE DRAWINGS

The subject conceived in accordance with the present invention will now be described in greater detail in the form of an embodiment given purely as an example, and illustrated in the attached drawing in which.

DETAILED DESCRIPTION OF THE PREFERRED EMBODIMENT

Figure 1:
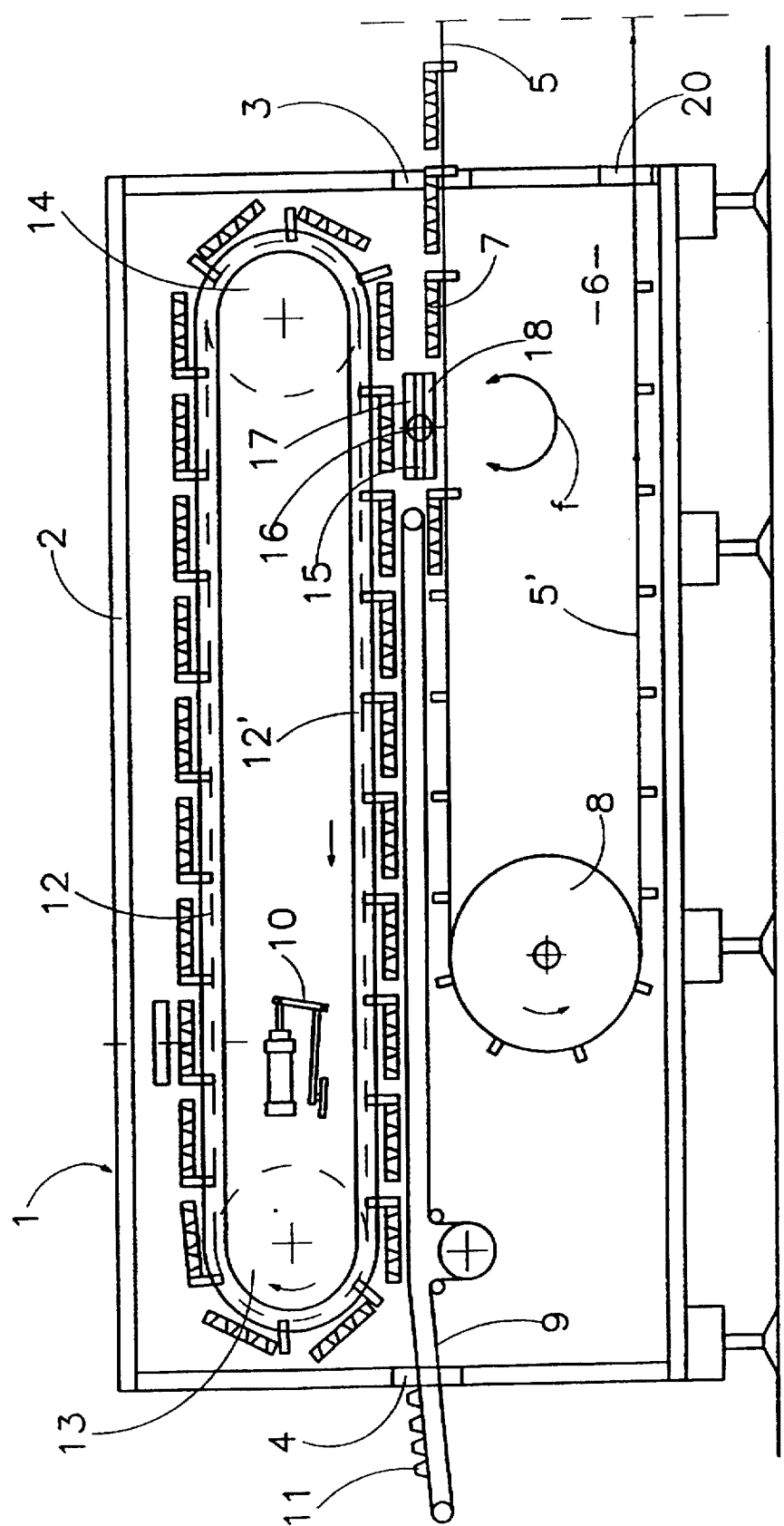
FIG. 1 shows a front view of the demolding unit conceived in accordance with the present invention.

The demolding unit, which bears the general reference 1, consists of a basically closed, or encapsulated, chamber 2 having a small entrance opening 3 and small exit openings 4, 20.

As is usual, molds 7, the openings of whose wells containing the chocolate product are uppermost, are fed intermittently by a pair of chains 5 through the entrance 3 and into the interior 6 of the chamber 2.

A deflection wheel 8 turns the supply chain 5 so that its lower chain portion 5' passes out of the chamber interior 6.

As is conventional, close to the chain 5 is a known belt 9 which, as it passes a conventional tapping device 10, collects the chocolate product 11.

Above the chain portions 5, 5' and the belt 9 is a closed loop formed by parallel chains 12, which are guided around deflection wheels 13 and 14.

Both the pair of chains 5 and pair of chains 12 possess known means for detachably supporting the molds 7.

Between the supply chains 5 and the chain 12 arranged in a loop, is an inverting device 15 which is able to pivot in the directions indicated by the arrow f about pins 16.

The inverting device comprises a guide 17 and a guide 18, into which guides, which are parallel, the molds 7 can be introduced.

The way in which the demolding device works is as follows:

the chains 5 feed in the molds 7 with the wells filled and open side uppermost.

The chains 5 are moved intermittently.

When the mold 7 reaches the inverting device 15, the chains 5 insert the relevant mold 7 into the lower guide 18 and, by a movement of controlled rotation (arrow f), the device 15 will be spun about the pin 16, bringing the full mold, inverted with the openings of the wells now facing down, into the vicinity of the lower initial portions 12' of the chains 12.

The full inverted mold is delivered to the chains 12 to be conveyed towards the tapping device 10, which acts on the bottom of the mold, the openings of the wells of which are facing downwards, i.e. towards the belt 9, which collects the demolded chocolate product 11.

The empty molds are conveyed, after the tapping device, along the upper portion of the loop of chains 12, until they reach the inverting device 15 in the known way.

Because the drives to the chains 5 and 12 are synchronized, the effect is that at the same time as a mold 7 is fed in with intermittent motion by the chains 5, and delivered to the lower guides 18, an empty mold is also introduced into the upper guides 17 of the inverting device. Consequently, when a full mold 7 is inverted by the device 15 and delivered to the chains 12, an empty mold, housed in the upper guide 17 of the device 15, will be simultaneously delivered to the chains 5 situated beneath it. The empty mold consequently advances towards the deflection wheel 8 and is passed out of the chamber interior 6 (supported by the portion 5' of chains), through the lower opening 20.

Thus, with the device having greatly reduced dimensions it becomes possible in an intermittently-operating demolding plant to take a full mold 7 from the supply chains 5, invert it and deliver it to a loop formed by portions 12' of chain located in a higher position, and, simultaneously, the inverting device 15 is capable of taking an empty mold supplied by the chains 12 (portion 12') and delivering it back, after rotation of the device 15, to the chains 5, enabling the empty mold 7 to be carried out of the chamber 6.

I claim:

1. A demolding apparatus for removing chocolates from molds, comprising:

a) a lower conveyor system having an upstream portion for carrying a plurality of full molds filled with chocolate, and a downstream portion for carrying a plurality of empty molds;

b) an upper conveyor system having a receiving portion for receiving the full molds in inverted position from the upstream portion of the lower conveyor system, a demolding portion for emptying the chocolate from the inverted full molds, and a conveyor portion for conveying the empty molds to the downstream portion of the lower conveyor system;

c) a chocolate removal conveyor for conveying the chocolate emptied from the inverted full molds at the demolding portion away from the upper conveyor system; and d) an inverting unit for inverting through 180° and transferring the full molds from the upstream portion of the lower conveyor system to the receiving portion of the upper conveyor system, and for simultaneously inverting through 180° and transferring the empty molds from the conveyor portion of the upper conveyor system to the downstream portion of the lower conveyor system.

2. The apparatus as recited in claim 1, wherein the lower conveyor system includes a lower chain, and a lower drive for intermittently advancing the lower chain.

3. The apparatus as recited in claim 1, wherein the upper conveyor system includes a closed loop chain, and an upper drive for intermittently advancing the closed loop chain.

4. The apparatus as recited in claim 1, wherein the demolding portion includes a tapping device for tapping the inverted full molds to empty the chocolate therefrom.

5. The apparatus as recited in claim 1, wherein the inverting unit includes a first elongated guide for receiving a respective one of the full molds from the upstream portion, a second elongated guide for receiving a respective one of the empty molds from the conveyor portion, and a pin extending along an axis that extends transversely of the guides.

6. The apparatus as recited in claim 1, and further comprising a housing having an entrance opening through which the upstream portion of the lower conveyor system enters, a first exit opening through which the downstream portion of the lower conveyor system exits, and a second exit opening through which the chocolate removal conveyor exits.

* * * * *